C. F. STEWART.
SILO SUPPORT.
APPLICATION FILED OCT. 10, 1913.
1,111,928.
Patented Sept. 29, 1914.
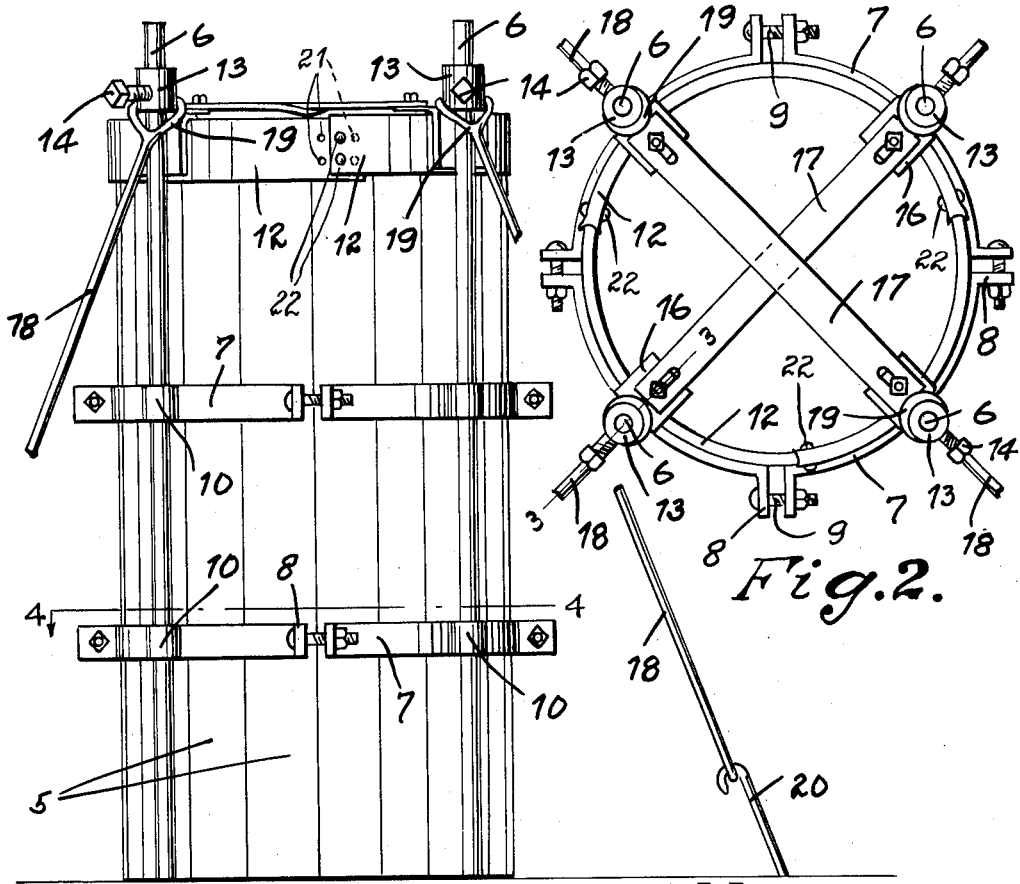
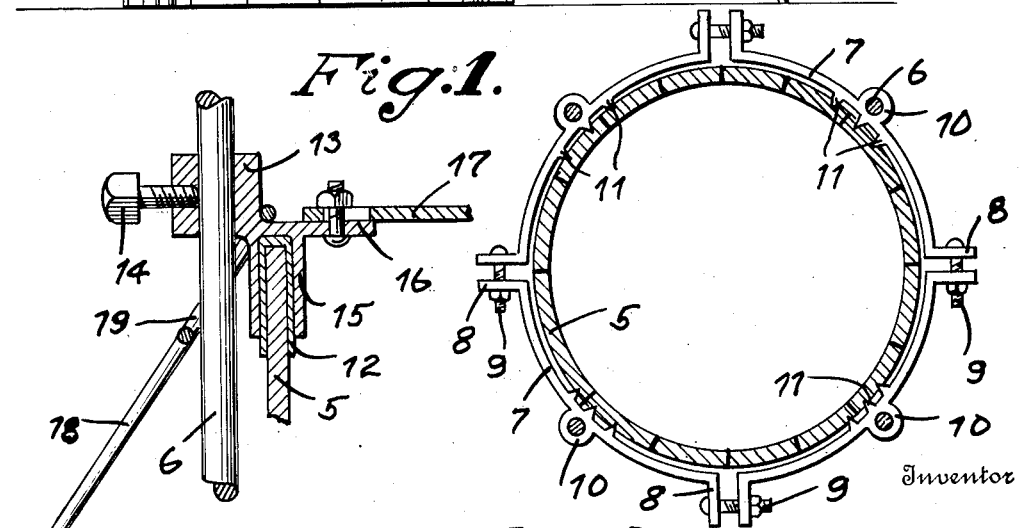
Fig.1. Fig.2. Fig.3. Fig.4.
Witnesses
M. S. Watson
Frank S. Ratcliff
Inventor
C. F. Stewart
By Chandler & Chandler
Attorneys

UNITED STATES PATENT OFFICE.

CHARLES F. STEWART, OF NASHVILLE, KANSAS.

SILO-SUPPORT.

1,111,928.  Specification of Letters Patent.  Patented Sept. 29, 1914.

Application filed October 10, 1913. Serial No. 794,524.

*To all whom it may concern:*

Be it known that I, CHARLES F. STEWART, a citizen of the United States, residing at Nashville, in the county of Kingman, State of Kansas, have invented certain new and useful Improvements in Silo-Supports; and I do hereby declare the following to be a full, clear, and exact description of the invention, such as will enable others skilled in the art to which it appertains to make and use the same.

This invention relates to new and useful improvements in supports for silos and particularly for silos comprising vertically arranged wooden slats.

The object of the present invention resides in the provision of means for supporting a silo of the class described, which will efficiently prevent the silo from any lateral or tipping movement and which is further adapted to hold the slats of the silo in their proper relative positions.

A further object of the invention resides in the provision of a support as above described which is adjustable to various heights and diameters of silos and which when in position about a silo is so constructed that it protects the silo from all strain and positively prevents any twisting of the silo due to wind pressure or other causes.

A still further object of the invention resides in the provision of a support of the class described which comprises a minimum number of simple parts so that it may be economically manufactured and quickly attached in position around a silo.

With these and other objects in view, the invention resides in the novel combination, formation and arrangement of parts to be more fully hereinafter described and illustrated in the accompanying drawings and particularly pointed out in the claims hereto appended.

Reference is had to the accompanying drawings wherein similar characters of reference designate corresponding parts throughout the several views and in which:

Figure 1 is a side elevational view of the improved support associated with a silo, Fig. 2 is a top plan view of what is shown in Fig. 1, Fig. 3 is a detail sectional view on the line 3—3 of Fig. 2, and Fig. 4 is a transverse sectional view on the line 4—4 of Fig. 1.

Referring now more particularly to the accompanying drawings, the silo proper is shown as comprising a plurality of vertically disposed slats 5 arranged to form a cylindrical body member.

The improved support comprising the embodiment of the invention includes a plurality of standards 6 disposed about and in intimate relation to the outer periphery of the silo. These standards are anchored in the ground and are secured to intermediate portions of the silo by bands composed of a plurality of sections 7. The sections of each band are positioned on the periphery of the silo with their ends disposed in spaced parallel relation and directed outwardly at 8. Tightening screws 9 are passed through the portions 8 and rotated to bind the band or the silo. For securing the sections to the adjacent standards, each section is provided with a collar 10 slidable on the standard. Adjacent the collar, the inner face of each section is provided with a plurality of ribs 11 engaging the silo positively to prevent twisting thereof.

By the above construction not only are the uprights secured to the intermediate portions of the silo, but the slats of the silo are prevented from relative disengagement, as will be readily understood.

Embracing the upper edge of the silo are a plurality of channel members 12 disposed in lapping relation so that they may be adjusted to various diameters of silos, and serving to hold the top ends of the slats in proper relative position. The upper ends of the standards are extended past the silo and slidable on these end portions are a plurality of sleeves 13 adjustably held by the set screws 14. Secured to each of the sleeves are channel members 15 disposed over and about the channel members 12 to serve as securing means for the upper ends of the standards and to also securely anchor the silo to the ground. Lugs 16 extend inwardly from the channel members and tie rods 17 are secured to these lugs to prevent any distortion of the silo structure. To further brace the structure, guy rods 18 are provided having eye portions 19 at one end secured by and disposed about the sleeves 13 and having their other end secured to suitable securing means 20 on the ground.

From the foregoing it is observed that a very simple and efficient structure has been provided whereby the silo is securely held in position and against any tendency to twist or tip. It will be observed that various minor changes and modifications within the scope of the appended claims may be made without departing in any manner from the spirit of the invention.

The channel members 12 are held with relation to each other by series of openings 21 in the adjacent ends of the members and bolts 22 passed through alining openings of the series.

What is claimed is:

1. A silo support comprising the combination with a cylindrical silo comprising vertical staves, of a plurality of uprights disposed in intimate relation to the outer periphery of the silo and extending thereabove, channel members slidable on the uprights and engaging over the top edge of the silo to anchor the same and guy rods extending from said channel members and anchored adjacent the ground.

2. A silo support comprising the combination with a cylindrical silo disposed vertically, of a plurality of uprights disposed in intimate relation to and extending above its outer periphery, channel members on the uprights and engaging over the top edge of the silo to anchor the same, tie rods connecting diametrically opposed channel members and guy rods extending from the channel members and anchored adjacent the ground.

In testimony whereof, I affix my signature, in the presence of two witnesses.

CHARLES F. STEWART.

Witnesses:
 W. H. HALL,
 S. A. SCOTT.